United States Patent
Yamamoto et al.

(10) Patent No.: US 7,383,982 B2
(45) Date of Patent: Jun. 10, 2008

(54) CARD RECOGNITION SYSTEM FOR RECOGNIZING STANDARD CARD AND NON-STANDARD CARD

(75) Inventors: Hitoshi Yamamoto, Hyogo-ken (JP); Hiromasa Kusakabe, Hyogo-ken (JP)

(73) Assignee: Ricoh Company, Ltd., Tokyo (JP)

( * ) Notice: Subject to any disclaimer, the term of this patent is extended or adjusted under 35 U.S.C. 154(b) by 76 days.

(21) Appl. No.: 10/925,461

(22) Filed: Aug. 24, 2004

(65) Prior Publication Data

US 2005/0077355 A1 Apr. 14, 2005

(30) Foreign Application Priority Data

Aug. 27, 2003 (JP) ............... 2003-302789
Sep. 11, 2003 (JP) ............... 2003-320256

(51) Int. Cl.
*G06K 19/00* (2006.01)

(52) U.S. Cl. ..................... 235/375; 235/487

(58) Field of Classification Search ........... 235/375, 235/487, 492, 493

See application file for complete search history.

(56) References Cited

U.S. PATENT DOCUMENTS

| | | | |
|---|---|---|---|
| 5,291,189 A | 3/1994 | Otake et al. | |
| 5,515,482 A | 5/1996 | Yamamoto et al. | |
| 5,664,078 A | 9/1997 | Yamamoto et al. | |
| 5,752,857 A * | 5/1998 | Knights | 439/638 |
| 5,771,046 A | 6/1998 | Izawa et al. | |
| 5,895,502 A | 4/1999 | Yamamoto | |
| 5,982,398 A | 11/1999 | Yamamoto | |
| 6,232,986 B1 | 5/2001 | Yamamoto | |
| 6,438,638 B1 * | 8/2002 | Jones et al. | 710/301 |
| 6,457,647 B1 * | 10/2002 | Kurihashi et al. | 235/486 |
| 6,718,274 B2 * | 4/2004 | Huang et al. | 702/64 |
| 6,945,461 B1 * | 9/2005 | Hien et al. | 235/451 |
| 2002/0133654 A1 | 9/2002 | Yamamoto | |
| 2004/0083309 A1 | 4/2004 | Yamamoto | |
| 2004/0130016 A1 | 7/2004 | Yamamoto | |
| 2004/0133712 A1 | 7/2004 | Yamamoto et al. | |

FOREIGN PATENT DOCUMENTS

JP 2001-75746 3/2001

* cited by examiner

*Primary Examiner*—Daniel Stcyr
(74) *Attorney, Agent, or Firm*—Cooper & Dunham, LLP

(57) ABSTRACT

A novel card recognition system includes a computer having a card controller for exchanging data with a standard card that is compliant with a standard and a non-standard card that is not compliant with the standard, and a card adapter for connecting the non-standard card to the computer so that the non-standard card is recognized. The computer or card adapter includes a data converter having an input/output controller for the non-standard card and converting data of the non-standard card into data for the standard card, and an interface having an input/output controller for the standard card and connected to the data converter via a dedicated transmission path.

16 Claims, 12 Drawing Sheets

CARD RECOGNITION SYSTEM FOR RECOGNIZING STANDARD CARD AND NON-STANDARD CARD

BACKGROUND

1. Technical Field

This disclosure relates to a card recognition system that allows a non-PCMCIA-standard card such as a smart card to be recognized as a PCMCIA-standard card, more particularly, to an improvement of a converter, which is provided in a card adaptor or a computer in the card recognition system and enables use of a non-PCMCIA-standard card as a PCMCIA-standard card.

PCMCIA is an abbreviation of Personal Computer Memory Card International Association.

2. Description of Related Art

A conventional card recognition system includes an adapter for connecting a non-PCMCIA-standard card, such as a smart card having an irregular connector that is not compliant with the PCMCIA standard, to a PC-card connector, and a converter for allowing a computer to recognize the non-PC card connected to the adapter as a PC card to allow the non-PC card to be used with a computer having a connector for a PCMCIA-standard card. The adapter includes an active adapter or a passive adapter.

The active adapter includes the above-described converter. In a card recognition system that employs the active adapter, a computer does not need to include a special circuit for recognizing a non-PC card such as a smart card.

On the other hand, the passive adapter internally translates the assignment of signal pins of a smart card into that of a PC card, and does not include a converter.

Thus, in a card recognition system that employs the passive adapter, a computer must include a detector that detects a connection of a passive adapter for smart card, and a converter that is activated when a connection of the passive adapter is detected by the detector and converts data output from the smart card into data for a PC card.

Now, the configuration and problems of a conventional converter will be described in the context of an exemplary card recognition system that employs an active adapter.

FIG. 11 is an exemplary diagram showing a smart card 1, which is a non-PC card, a computer 3, and an active adapter 10, forming a card recognition system S4 for the smart card 1.

The computer 3 includes a chipset 4 having a PCI (Peripheral Components Interconnect) bus B1, a CPU (Central Processing Unit) 5, a memory 6, a hard disk 7 connected to the chipset 4, and a PC-card controller 8 for recognizing a PCMCIA-compliant PC card. Also, the computer 3 has a PC-card connector 2 that is connected to the PC-card controller 8.

The smart-card active adapter 10 has a contact connector 16 associated with a contact terminal surface la of the smart card 1, and a female connector 10b associated with a PC-card male connector 2 of the computer 3. Also, the smart-card active adapter 10 includes a converter C2, provided between the contact connector 16 and the female connector 10b, which converts data output from a smart card, which is a non-PC card, into data for a PC card and that outputs the data to the computer side.

The converter C2 includes a PC-card interface 11 that exchanges data with the PC-card controller 8 via the connector 2, a CPU 12, a RAM 13, a ROM 14, and a smart-card controller 15, which exchange data with the interface 11 via a bus B2.

The smart-card controller functions as a data converter for smart card in this patent application.

When the smart card 1 is connected to the smart-card contact connector 16, the smart-card controller 15 detects the connection and notifies the CPU 12 of the connection. The CPU 12 outputs information from the smart card 1 to the PC-card controller 8 of the computer 3 via the PC-card interface 11.

The flow of data from the smart card 1 to the computer 3 is as follows. Data from the smart card 1 is stored in an FIFO unit 15a included in the smart-card controller 15. The FIFO unit 15a functions as a buffer memory for absorbing a difference in data processing speed between the smart card 1 and a PC card. Upon detecting that data is stored in the FIFO unit 15a, the CPU 12 reads the data stored in the FIFO unit 15a and saves the data in the work RAM 13. The CPU 12 notifies the PC-card controller 8 of the computer 3 via the PC-card interface 11 and the connector 2, using an interrupt signal, that data has been received from the smart card 1, and outputs the data stored in the RAM 13 to the PC-card controller 8 by a similar procedure.

The data stored in the RAM 13 is temporarily held in a register 11a in the PC-card interface 11 before it is output.

The flow of data from the computer 3 to the smart-card 1 is as follows.

The host CPU 5 in the computer 3 outputs data stored in the memory 6 to the connector 2 via the chipset 4, the PCI bus B1, and the PC-card controller 8. Upon receiving data via the connector 2, the PC-card interface 11 temporarily stores transmission data in the internal register 11a. Upon detecting that the transmission data is stored in the register 11a, the CPU 12 writes the transmission data to the work RAM 13 via a data bus B2. The CPU 12 writes the data written to the RAM 13 to the FIFO unit 15a in the smart-card controller 15. The smart-card controller 15 outputs the data written to the FIFO unit 15a to the smart card 1 via the contact connector 16. Programs that are executed by the CPU 12 are all stored in a flash ROM 14.

The converter C2 included in the smart-card active adapter 10 includes the CPU 12, the work RAM 13, and the flash ROM 14 for exchanging data between the PC-card interface 11 and the smart-card controller 15, resulting in the problem that the circuitry scale is large.

Furthermore, as described earlier, in the converter C2, data output from the smart card 1 is stored in the FIFO unit 15a in the smart-card controller 15, the work RAM 13, and the register 11a of the PC-card interface 11 in order, and is then output to the computer 3. Thus, the efficiency of data transmission is low.

Furthermore, since the flash ROM 14 included in the converter C2 is manufactured by a process that is different from a process for manufacturing ordinary CMOS (Complementary Metal-Oxide Semiconductor), the number of manufacturing steps is large and manufacturing cost is high. This is also true in a case where an EEPROM (Electronically Erasable and Programmable Read Only Memory) is used instead of a flash ROM.

According to another type of related art, a notebook computer has a plurality of (e.g., two) connectors for connecting PCMCIA-compliant PC cards. Furthermore, some computers of the above type include a smart-card controller for recognizing a smart card connected to one of the PC-card connectors via a passive adapter.

FIG. 12 is an exemplary diagram showing a configuration of a conventional card recognition system S5.

The card recognition system S5 has two PC-card connectors 110 and 111. Also, the card recognition system S5 includes a computer 200 including a PC-card controller 150, and a smart-card passive adapter 120 for connecting a smart card, which is a non-PC card, to the connector 110 or 111.

The computer 200 includes a chipset 101, a host CPU 102, a memory 103, a hard disk (HDD) 104, provided around the chipset 101, and a PC-card controller 150.

The PC-card controller 150 includes a first controller 152 and a second controller 157 respectively associated with the two PC-card connectors 110 and 111, and has a PCI interface 151.

The first and second controllers 152 and 157 are configured identically to each other, so that description will be directed only to the configuration of the first controller 152, with reference numerals of the corresponding parts of the second controller 157 in parentheses.

A card detector 154 (159) outputs information of a card connected to the connector 110 (111) to a PC-card controlling device 153 (158).

When a smart card 130 is connected via the passive adapter 120, the card detector 154 (159) outputs a high-level smart-card enable signal SCEN1 (SCEN2) to a multiplexer (MUX) 156 (161).

On the other hand, when a PC card 140 is connected, the card detector 154 (159) outputs a low-level smart-card enable signal SCEN1 (SCEN2) to the multiplexer 156 (161).

The multiplexer 156 (161) makes the smart-card controller 155 (160) to act between the smart card 130 and the PC-card controller 153 (158) when a high-level smart-card enable signal SCEN1 (SCEN2) is being input, while connecting the PC card 140 directly to the PC-card controller 153 (158) when a low-level smart-card enable signal SCEN1 (SCEN2) is being input.

According to a survey of actual usage of notebook computers having two PC-card connectors, two smart cards are seldom used simultaneously, and typical usage is such that a smart card for personal identification is connected to one of the two PC-card connectors and a wireless LAN card or a modem card is connected to the other PC-card connector. In this type of usage, the card detector (154 or 159) and the smart-card controller (155 or 160) provided in one of the controllers (152 or 157) are seldom used and are not so useful.

However, if the card detector (154 or 159) and the smart-card controller (155 or 160) are provided only in one of the first and second controllers 152 and 157, there is a case that a PC card already is connected to a connector associated with a smart-card controller when a smart card is to be used. In that case, use of the PC card must once be stopped and the PC card must be replaced to the other connector, resulting in inconvenience.

SUMMARY

This disclosure describes a novel card recognition system for recognizing standard card and non-standard card. In one example, the card recognition system includes a computer having a card controller for exchanging data with a standard card that is compliant with a standard and a non-standard card that is not compliant with the standard, and an active card adapter for connecting the non-standard card to the computer so that the non-standard card is recognized. The active card adapter includes a data converter having an input/output controller for the non-standard card and converting data of the non-standard card into data for the standard card, and an interface, having an input/output controller for the standard card and connected to the data converter via a dedicated transmission path.

The above-mentioned data converter or interface can further comprise a circuit for converting a first number of bits of data output from the data converter into a second number of bits of data for a standard card.

The above-mentioned data converter can further comprise a timing controller that independently controls liming of outputting a signal in response to a request from the computer.

The above-mentioned standard includes PCMCIA PC Card Standard, and the non-standard card includes a smart card.

This disclosure describes another novel card recognition system for recognizing standard card and non-standard card. In one example, the card recognition system includes computer having a card controller for exchanging data with a standard card that is compliant with a standard and a non-standard card that is not compliant with the standard, and a passive curd adapter for connecting the non-standard card to the computer so that the non-standard card is recognized. The card controller includes a data converter having an input/output controller for the non-standard card and converting data of the non-standard card into data for the standard card, and an interface having art input/output controller for the standard card and connected to the data converter via a dedicated transmission path.

The above-mentioned data converter or interface can comprise a circuit for converting a first number of bits of data output from the data converter into a second number of bits of data for a standard card.

The above-mentioned data converter can further comprise a timing controller that independently controls timing of outputting a signal in response to a request from the computer.

The above-mentioned data converter can further comprise a buffer memory capable of storing an amount of data that is output from the non-standard card at one transmission.

The above-mentioned standard includes PCMCIA PC Card Standard, and the non-standard card includes a smart card.

This disclosure describes another novel card recognition system for recognizing standard card and non-standard card. In one example, the card recognition system includes (a) at least two sets of card management systems, each set of the card management systems includes a card connector for connecting one of a standard card and non-standard card, a first controller configured to control the standard card, a first multiplexer arranged between the card connector and the first controller and configured to multiplex signals from the one of the standard card and the non-standard card connected to the card connector, a card detector configured to detect the one of the standard card and the non-standard card connected to the card connector, (b) a second controller connected to the first multiplexer of each of the at least two sets of card management systems and configured to control the non-standard card, and (c) a second multiplexer connected to the second controller and the first controller of each of the at least two sets of card management systems. The first multiplexer and die card detector of each of the at least two sets of card management systems, the second controller, and the second multiplexer form a job assignment controller configured to cause the second controller to intervene between the first controller and a card connector and to prohibit assignment of the second controller to other card connectors when the non-standard card is connected directly or indirectly via an adaptor to one of the card connectors of the at least two sets of card management systems.

The above-mentioned card detector does not perform a detection of a non-standard card at other card connectors when the non-standard card is detected at a connector.

The above-mentioned standard is PCMCIA PC Card Standard, and the non-standard card includes a smart card.

DETAILED DESCRIPTION OF PREFERRED EMBODIMENTS

Figure 1:
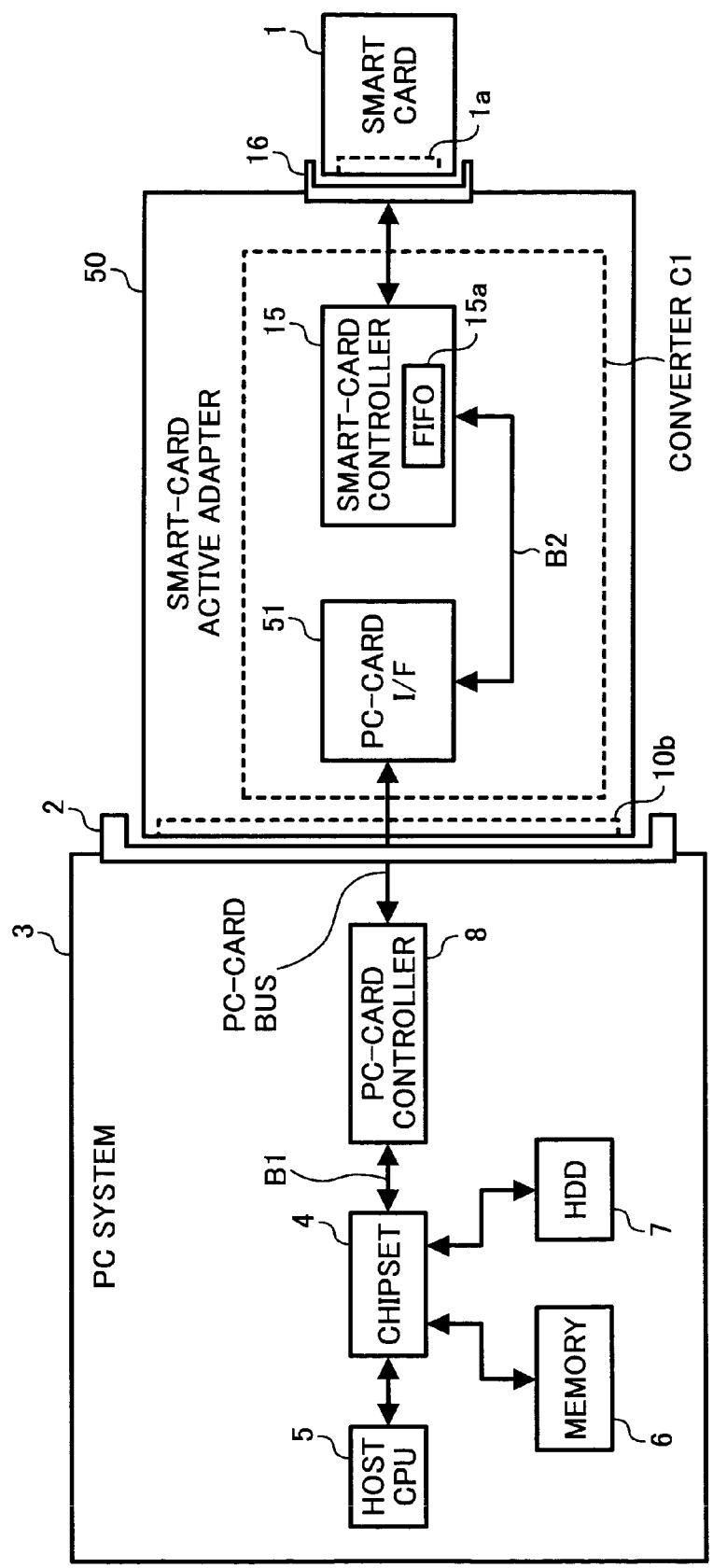
FIG. 1 is an exemplary diagram showing a configuration of a card recognition system according to a first embodiment of the present invention.

In describing preferred embodiments illustrated in the drawings, specific terminology is employed for the sake of clarity. However, the disclosure of the present patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, and more particularly to FIG. 1 thereof, an exemplary card recognition system for recognizing a non-standard card according to an exemplary embodiment is described.

FIG. 1 shows a card recognition system S1 according to an exemplary embodiment of the present invention. The card recognition system S1 includes an active adapter 50 including a converter C1. The converter C allows a non-PCMIA-standard card, for example, a smart card having a connector of a different shape, to be recognized as a PCMCIA-standard card. A non-PCMCIA-standard card will hereinafter be referred to as an irregular card or a non-PC card when appropriate, while a PCMCIA-standard card will hereinafter be referred to as a standard card or a PC card when appropriate. The converter C1 differs from the conventional converter C2 shown in FIG. 11 in that an improved PC card interface 51 is provided instead of the interface 11, the CPU 12, the RAM 13, and the ROM 14.

Figure 11:
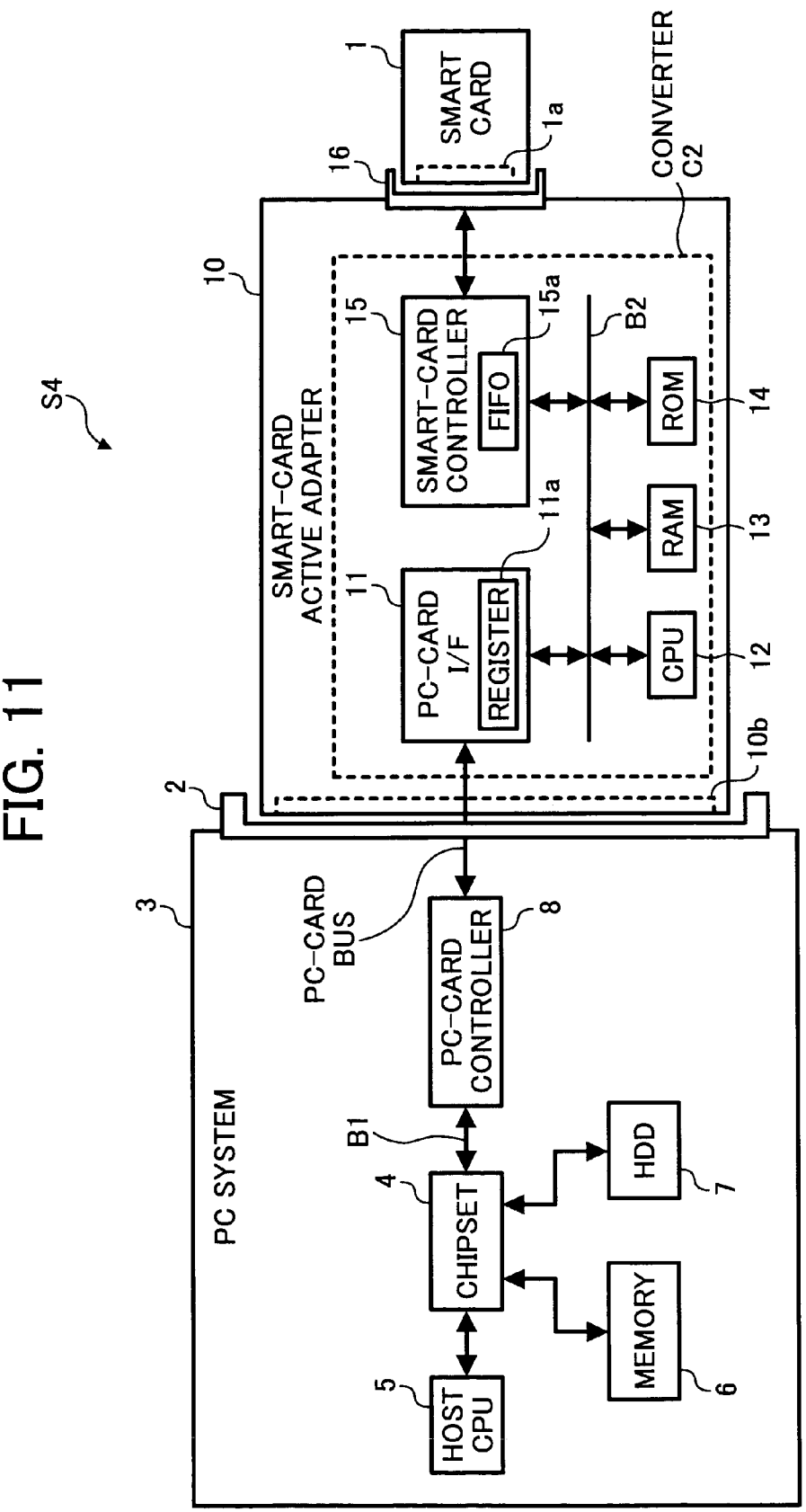
FIG. 11 is an exemplary diagram showing a configuration of a conventional card recognition system.

Of the components of the converter C1, parts corresponding to those of the conventional converter C2, described with reference to FIG. 11, are designated by the same reference numerals. Description will first be directed to the overall configuration of the card recognition system S1, and then to a specific configuration and operation of the converter C1.

A computer 3 includes a chipset 4 having a PCI bus B1, a CPU 5 that is connected to the chipset 4, a memory 6, a hard disk 7, and a PC-card controller 8 for recognizing a PCMCIA-compliant PC card (i.e., a standard card). The computer 3 also has a PC-card connector 2 that is connected to the PC-card controller 8.

The active adapter 50 for a smart card, which is an irregular card, has a contact connector 16 associated with a contact terminal surface 1a of a smart card 1, and a female connector 10b associated with a PC-card male connector 2 of the computer 3. In the active adapter 50, the converter C1 is disposed between the contact connector 16 and the female connector 10b, and it converts data output from the smart card 1 into data for a PC card and outputs the data to the computer side.

The converter C1 includes a smart-card controller 15 corresponding to the one provided in the conventional converter C2, and an improved PC-card interface 51 that is connected to the smart-card controller 15 via a bus B2 serving as a dedicated transmission path.

The smart-card controller 15 includes an FIFO unit 15a that functions as a buffer memory for absorbing a difference in data processing speed between the smart card 1 and a PC card.

The PC-card interface 51 converts data output from the smart-card controller 15 into standard data for a PC card. The standard for the data usually defines a data format such as distinction between serial and parallel, the number of bits of data, and so forth.

As will be described later in detail, in the PC-card interface 51, the number of bits of data is adjusted by a special circuit referred to as a signal converter 54.

Figure 2:
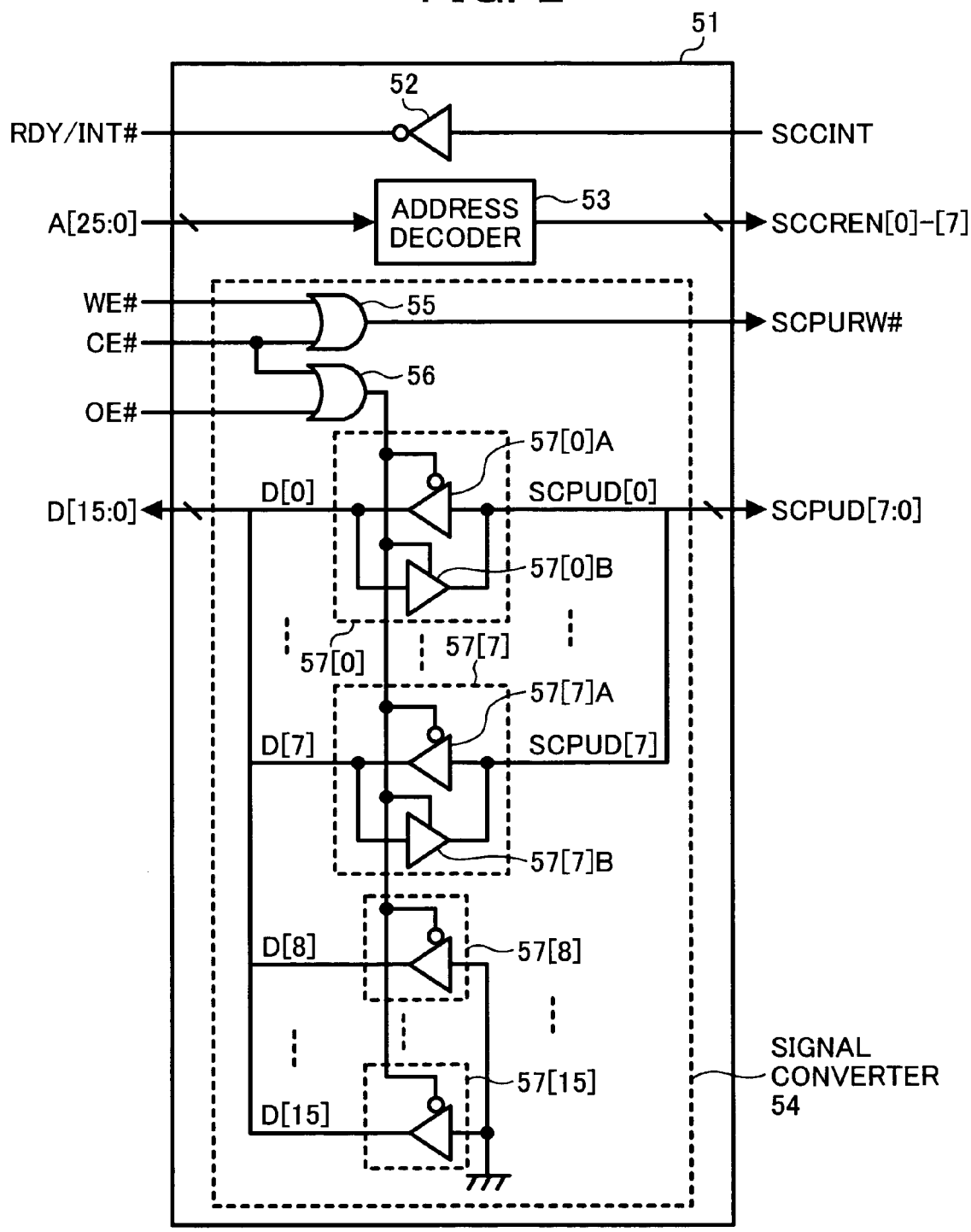
FIG. 2 is an exemplary diagram showing a configuration of a PC-card interface.

FIG. 2 is an exemplary diagram showing a configuration of the PC-card interface 51.

The PC-card interface 51 includes an interrupt-signal-conversion inverter 52, an address decoder 53, and a signal converter 54.

The address decoder 53 generates control signals SCCREN [0] to [7] that are used by the smart-card controller 15.

The signal converter 54 changes the number of bits of the smart-card data, having been converted into PC-card data in the smart-card controller 15, into a number of bits for PC-card data.

The interrupt-signal-conversion inverter 52 inverts a high-active interrupt signal SCCINT that is output by the smart-card controller 15 toward the host CPU 5 of the computer 3 when the smart card 1 is connected, and outputs as a low-active signal RDY/INT#.

Hereinafter, a "#" symbol attached at the end of the name of a signal indicates that the signal is low active.

The address decoder 53 includes eight registers having predetermined addresses assigned thereto. When the value of 26-bit address data A[25:0] transferred from the computer 3 coincides with one of the addresses assigned to the eight registers, with respective register enable signals SCCREN [0] to [7] that serve as control signals, the address decoder 53 switches one of the enable signals associated with the register having the address coinciding with the value of the address data A[25:0] to a high level, thereby specifying an address bus of the PC-card bus.

Figure 3:
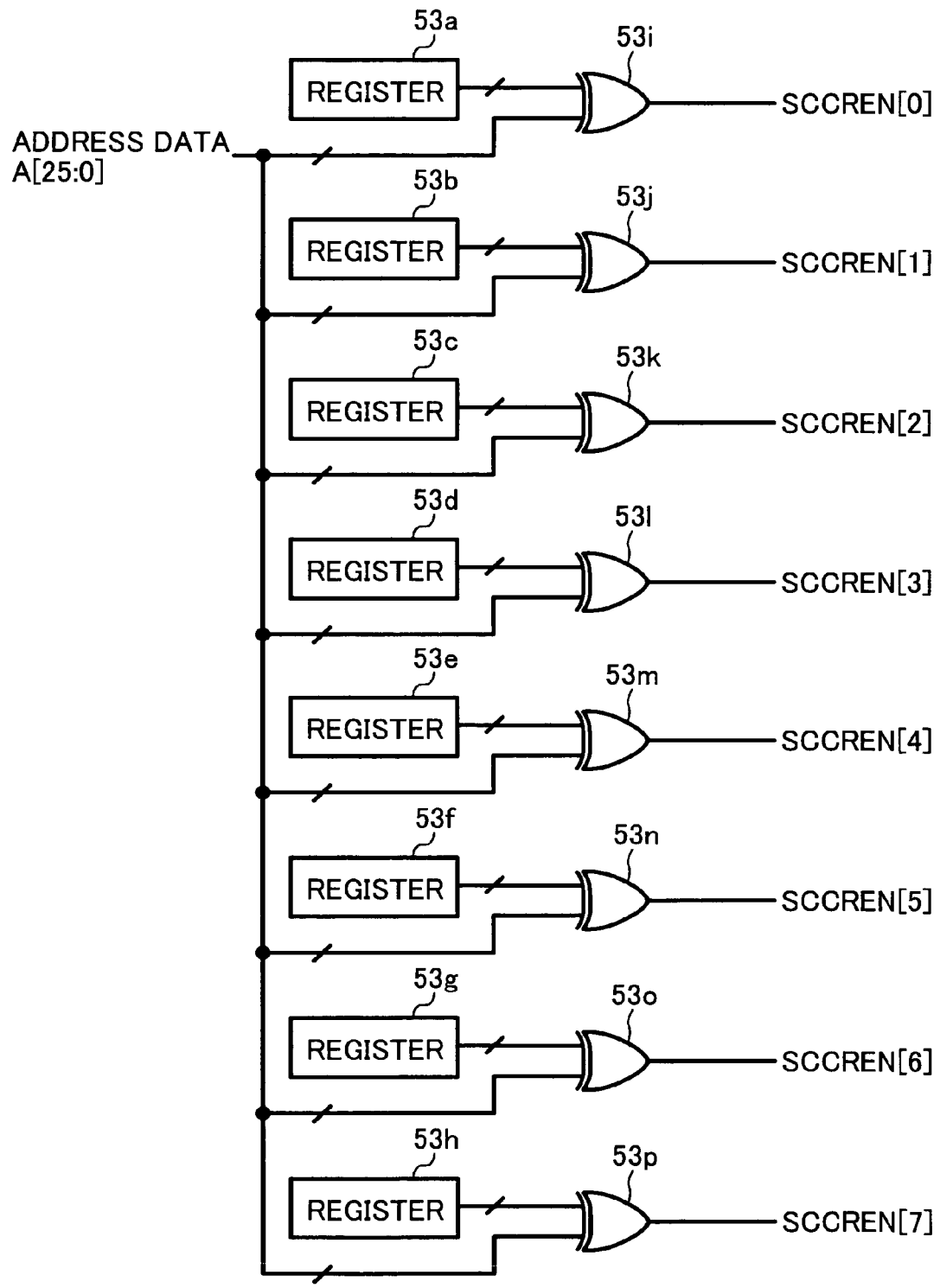
FIG. 3 is an exemplary diagram showing a configuration of an address decoder.

FIG. 3 is an exemplary diagram showing a configuration of the address decoder 53.

As illustrated in FIG. 3, the address decoder includes eight registers 53a to 53h and eight EXOR gates 53i to 53p.

The registers 53a to 53h respectively store predetermined eight types of data each consisting of 26 bits.

The EXOR gates 53i to 53p respectively calculate exclusive-OR (EXOR) between the 26-bit data stored in the registers 53a to 53h and the address data A[25:0], and output the results as register enable signals SCCREN [0] to [7].

When the address data A[25:0] coincides with data stored in one of the eight registers 53a to 53h, the address decoder 53, configured as described above, switches a relevant one of the register enable signals SCCREN [0] to [7] to a high level, and outputs the signal.

Referring back to FIG. 2, the signal converter 54 includes two OR gates 55 and 56, eight bi-directional gates 57[0] to 57[7], and eight uni-directional gates 57[8] to 57[15].

Each of the eight bi-directional gates 57[n] (where n is an integer from 0 to 7) is formed by a parallel connection of a tri-state buffer 57[n] A and a tri-state buffer 57[n] B.

The tri-state buffer 57[n] A passes bit data SCPUD[n] from the smart-card side to the computer side when a low-level signal is input.

Conversely, the tri-state buffer 57[n] B passes bit data D[n] from the computer side to the smart-card side when a high-level signal is input.

The eight uni-directional gates 57[m] (where m is an integer from 8 to 15) are tri-state buffers that output "0"s to the computer side as upper eight bits of 16-bit data D[15:0] when a low-level signal is input.

The OR gate 55 outputs a low-level write enable signal SCPURW# when both a write enable signal WE# and a chip enable signal CE# output from the PC-card controller 8 of the computer 3 in compliance with PCMCIA are switched to a low level.

When the signal WE# or CE# is switched to a high level, the OR gate 55 outputs a high-level data read enable signal SCPURW#.

When both the chip enable signal CE# and an output enable signal OE# are at a low level, the OR gate 56 outputs low-level signals to the eight bi-directional gates 57[0] to 57[7] and eight uni-directional gates 57[8] to 57[15].

Thus, the 8-bit data SCPUD[7:0] from the smart-card side is converted into 16-bit data D[15:0], which is output toward the computer 3.

When the signal CE# or OE# is switched to a high level, the OR gate 56 outputs high-level signals to the eight bi-directional gates 57[0] to 57[7] and the eight uni-directional gates 57[8] to 57[15].

In this case, the upper eight bits of the 16-bit data D[15:0] from the computer 3 are deleted, and the remaining 8-bit data is output toward the smart card 1 as SCPUD[7:0].

The improved PC-card interface 51 allows efficient exchange of data between the smart card 1 and the computer 3 by the operation of the signal converter 54 without using registers or the like.

Figure 4:
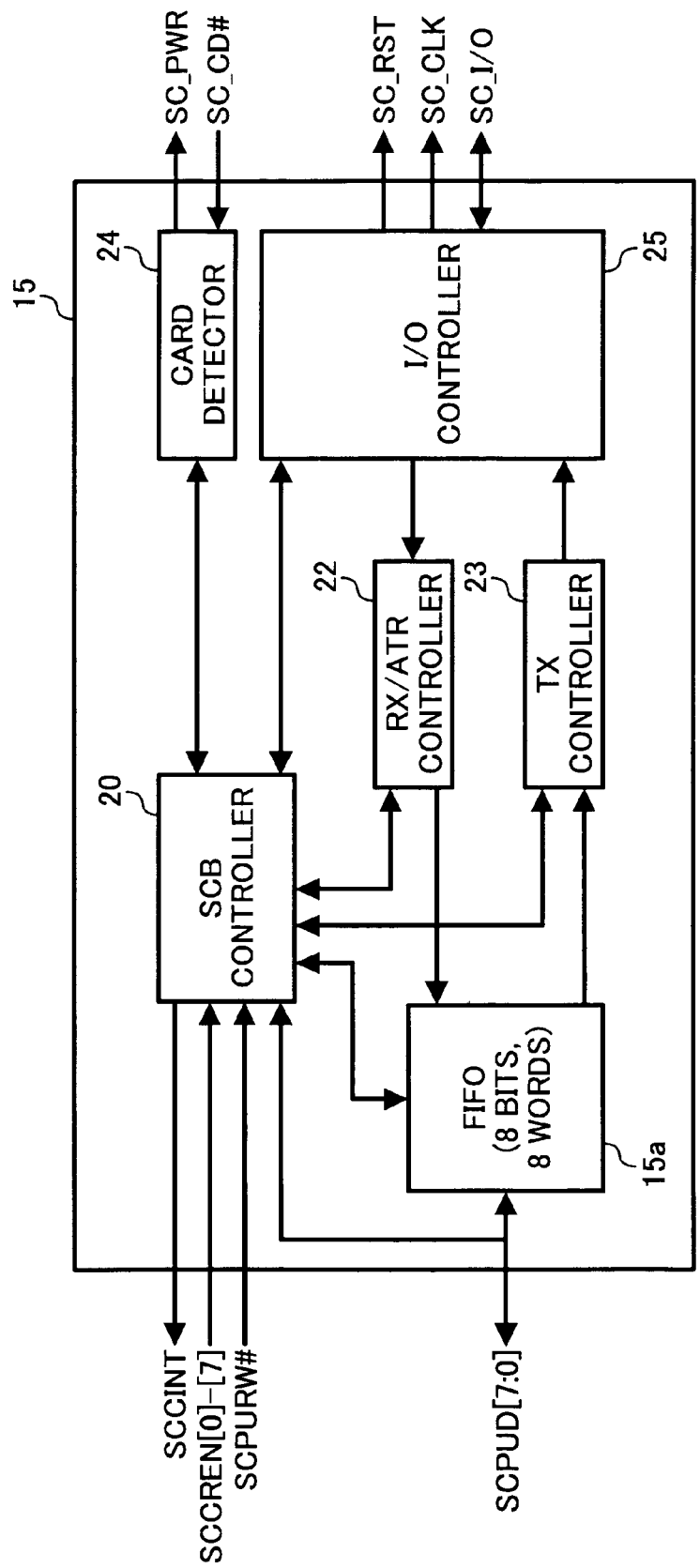
FIG. 4 is an exemplary diagram showing a configuration of a smart-card controller.

FIG. 4 is an exemplary diagram showing a configuration of the smart-card controller 15.

The smart-card controller 15 includes an SCB controller 20, an FIFO unit 15a, an RX/ATR controller 22, a TX controller 23, a card detector 24, and an I/O controller 25.

The configuration of the smart-card controller 15 is the same as that of the smart-card controller included in the converter C2 of the active adapter 10 in the conventional card recognition system shown in FIG. 11. Thus, it suffices here to simply describe that signals output from the above-described PC-card interface 51 are input to and processed by the smart-card controller 15.

The card detector 24 receives input of an SC_CD# signal indicating whether the smart card 1 is connected to the contact connector 16. When the SC_CD# signal is at a low level, the card detector 24 notifies the SCB controller 20 that a smart card has been detected. Furthermore, the card detector 24 outputs an SC_PWR signal that allows supply of power to the smart card 1 to a power source (not shown).

As will be described later, the I/O controller 25 outputs a reset signal SC_RST for the smart card 1 according to an instruction from the SCB controller 20. Furthermore, the I/O controller 25 exchanges an I/O signal SC_I/O and a clock signal SC_CLK with the smart card 1.

The RX/ATR controller 22 receives data from the I/O controller 25 bit by bit, converts the data into parallel data of eight bits, and outputs the parallel data to the FIFO unit 15a. Furthermore, the RX/ATR controller 22 determines an initial elementary time unit (ETU) (i.e., a bit transmission time) that specifies the number of clock cycles needed to transmit 1-bit data based on an answer to reset (ATR) (i.e., initial response information) received from the smart card 1 at the time of an initial connection.

The TX controller 23 converts 8-bit data from the FIFO unit 15a into bit-by-bit serial data, and outputs the serial data to the I/O controller 25. The TX controller 23 is also connected to the SCB controller 20.

The FIFO unit 15a functions as a buffer memory that absorbs a difference in data processing speed between the smart card 1 and a PC card. The FIFO unit 15a includes eight FIFOs (corresponding to eight words) each capable of storing 8-bit data.

The FIFO unit 15a outputs 8-bit data input from the RX/ATR controller 22 to a data bus referred to as an SCBDB (not shown), and outputs 8-bit data input from the SCBDB and stored in one of the eight FIFOs to the TX controller 23. The SCBDB bus is also connected to the SCB controller 20.

As described above, in the card recognition system according to an exemplary embodiment, the configuration of a converter included in an active adapter is considerably simplified, and fully eliminates a register and the like that cause delay of data processing (i.e., the RAM 13 that functions as a work memory, and the register 11a of the PC card interface 11, included in the conventional converter C2 shown in FIG. 11).

Thus, in addition to the advantages of using a special circuit to implement the functions that are implemented in software with the CPU 12 in the conventional converter C2 shown in FIG. 11, processing speed is further increased, and compact design is allowed due to the absence of the register and the like.

Furthermore, since a flash ROM (or an EEPROM) is eliminated from the conventional converter C2 shown in FIG. 11, the converter C1 can be manufactured together with other processing units. This serves to improve the efficiency of manufacturing.

Although the card recognition system S1 according to the above-described exemplary embodiment includes the improved converter C1 in the active adapter 50, a card recognition system according to the present invention is not limited to one including the active adapter 50, and may include a passive adapter instead. In that case, the improved converter C1 is included in a computer.

Figure 5:
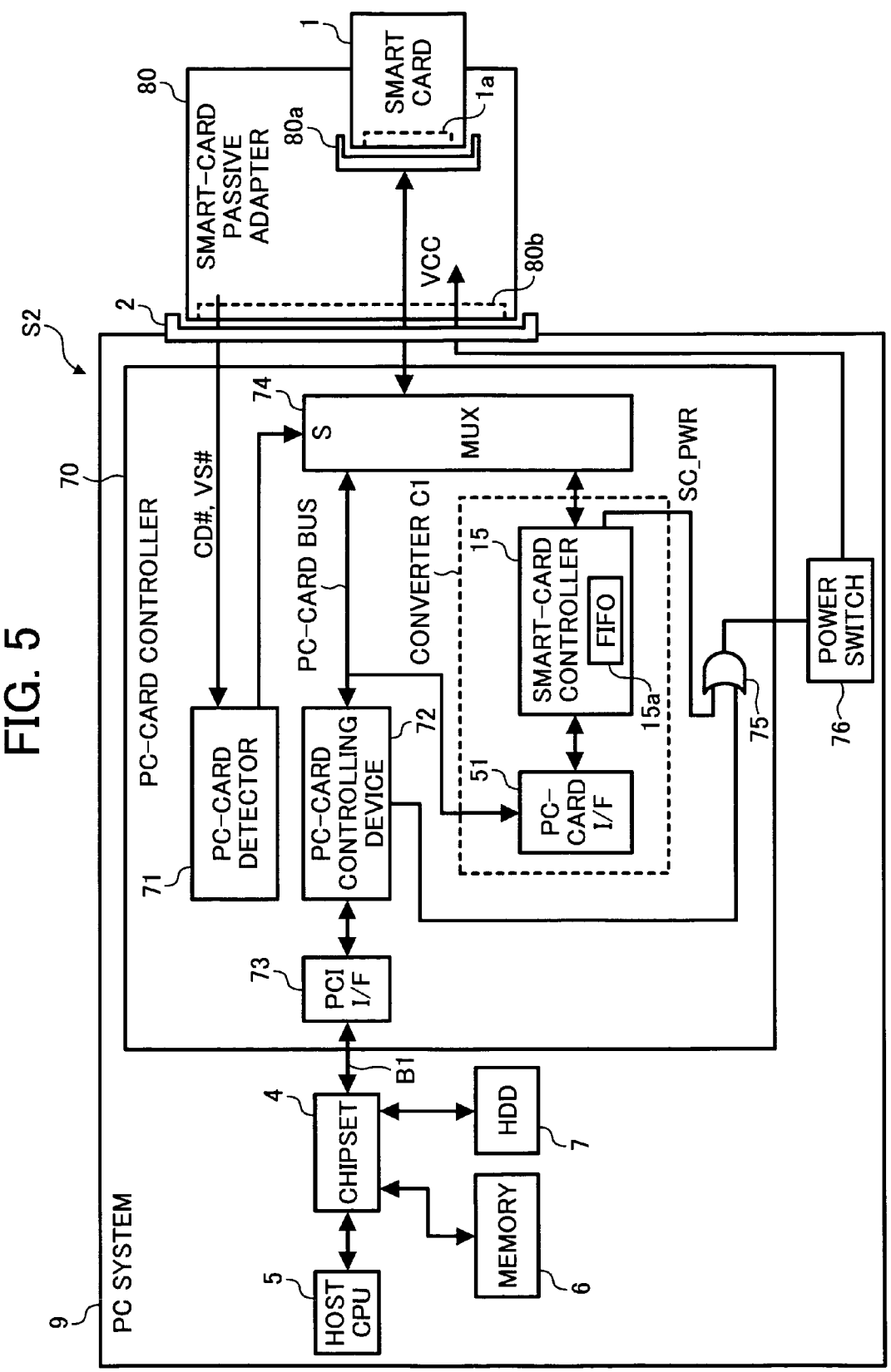
FIG. 5 is an exemplary diagram showing a configuration of a card recognition system according to another embodiment of the present invention.

Hereinafter, another exemplary embodiment will be explained. FIG. 5 is an exemplary diagram showing a configuration of a card recognition system S2 according to another exemplary embodiment of the present invention. The card recognition system S2 includes a passive adapter 80.

The passive adapter 80 is of a known type that internally translates the pin assignment of a smart card 1 into that of a PC card. The passive adapter 80 has a contact connector 80a associated with a contact terminal surface 1a of the smart card 1, and a female connector 80b for a PC card.

A computer 9 includes a chipset 4 having a PCI bus B1, a CPU 5 that is connected to the chipset 4, a hard disk 7, and a PC-card controller 70 for recognizing a PCMCIA-compliant PC card. The computer 9 also has a PC-card connector 2 that is connected to the PC-card controller 70.

Now, a configuration of the PC card controller 70 will be described. A PC-card detector 71 determines whether the connector 2 is connected to a PCMCIA-compliant PC card or the passive adapter 80 for a smart card.

A multiplexer 74 switches the bus based on a result of detection by the PC-card detector 71.

When the connector 2 is connected to a PC card, the multiplexer 74 connects the PC-card controlling device 72 with the connector 2.

On the other hand, when the connector 2 is connected to the passive adapter 80 for a smart card, the multiplexer 74 connects the connector 2 with the converter C1.

The converter C1 is connected to the PC-card controlling device 72. That is, when the passive adapter 80 for a smart card is connected to the connector 2, the converter C1 intermediates between the connector 2 and the PC-card controlling device 72 to convert data from the smart card 1 into data for a PCMCIA-compliant PC card, and outputs resulting data to the PC-card controlling device 72. The output of the PC-card controlling device 72 is transferred to the chipset 4 via a PCI interface 73 and the PCI bus B1.

A power switch 76 supplies a power supply voltage Vcc to a card connected via the connector 2 when a high-level PWR signal or SC_PWR signal is output from the PC-card controlling device 72 or the converter C1. The power switch 76 is driven by a signal from an OR gate 75.

Also in the card recognition system including the passive adapter 80, since the improved converter C1 is included in the computer 9, the scale of circuitry is reduced, and the efficiency of data transmission in the converter is improved.

By using the above-mentioned improved converter C1, the CPU, ROM, and RAM included in the conventional converter C2 shown in FIG. 11 are eliminated, so that the scale of circuitry is reduced. As a result, the computer 3 is in charge of controlling timing relating to signal output.

However, if the host CPU 5 is a multi-task CPU that is capable of concurrently processing a plurality of jobs, it is difficult to strictly control timing when an application that requires high processing capability (i.e., an application that is heavy) is being executed or when a large number of applications is simultaneously running.

For example, it is difficult to strictly control timing of reading and writing data, timing of a reset period, and so forth.

As a result, it is difficult to constantly satisfy the EMV standard that a reset period must be a period of a clock signal at a frequency of approximately 4 MHz cycles 40,000 to 45,000 times (approximately 10 ms to 11.25 ms).

Hereinafter, another exemplary embodiment of the present invention, which is an improvement of the converter C1 used in the card recognition systems S1 and S2 according to the above-mentioned embodiments will be described.

Figure 6:
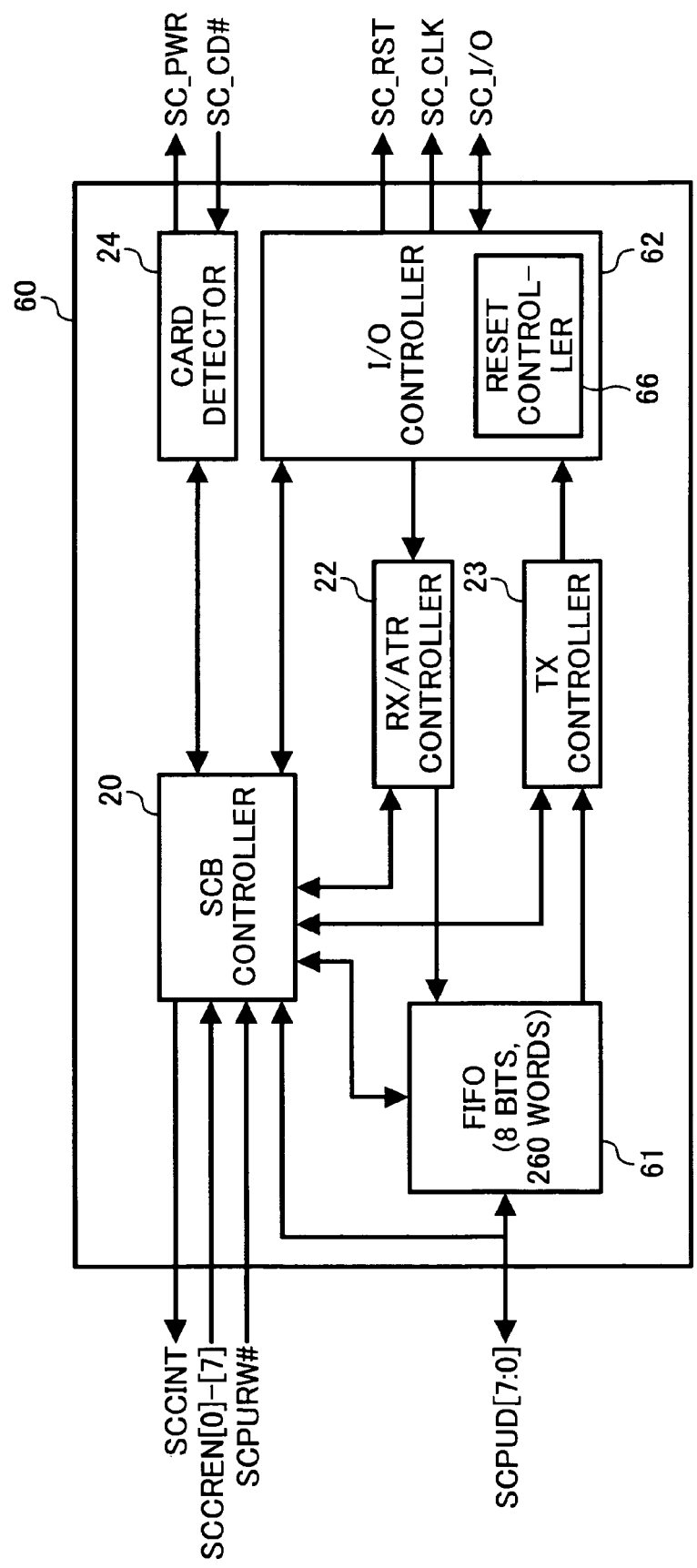
FIG. 6 is an exemplary diagram showing a configuration of a smart-card controller included in a card recognition system according to another embodiment of the present invention.

As shown in FIG. 6, a smart-card controller 60 is provided instead of the smart-card controller 15 in the converter C1. As shown in FIG. 6, the smart-card controller 60 includes a large-capacity FIFO unit 61 that functions as a buffer memory, and an I/O controller 62 including a reset controller 66 that independently operates as a timing controller.

This allows data to be reliably read from and written to the smart card 1. Also, a reset period can be controlled strictly, i.e., a reset period can be controlled so as to satisfy the EMV standard. Furthermore, various timing control operations are allowed by changing setting of the reset controller 66 (i.e., setting values of a register 68 described later) from the host CPU 5.

FIG. 6 is a exemplary diagram showing a configuration of the improved smart-card controller 60. Parts corresponding to those in the smart-card controller 15 are designated by the same reference numerals.

As described above, in contrast to the smart-card controller 15, the smart-card controller 60 includes the FIFO UNIT 61 capable of storing a large number of words (260 words), and the I/O controller 62 including the reset controller 66.

First, the FIFO unit 61 capable of storing 260 words will be described. The FIFO unit 15a of the smart-card controller 15 shown in FIG. 4 is only capable of storing eight words of 8-bit data. According to the smart card protocol, data up to 260 bytes at maximum is continuously sent and received as block data.

For example, when the rate of receiving data by the host CPU 5 is lower than the rate of data output from the smart card 1, the FIFO unit 15a overflows (i.e., a buffer overflow occurs), so that received data cannot be read correctly.

On the other hand, when the rate of receiving data from the FIFO unit 15a by the smart card 1 is higher than the rate of writing data from the host CPU 5 to the FIFO unit 15a, data is transmitted to the smart card 1 intermittently, so that the smart card 1 incorrectly recognizes the amount of block data.

Accordingly, instead of the FIFO unit 15a, the large-capacity FIFO unit 61 capable of storing as much data as 260 words of 8-bit data, which is equivalent to the maximum number of bytes that can be transferred at one time from the smart card 1, is provided. Thus, it is possible to read data from or write data to the smart card 1 or the computer 9 after completion of writing data to the FIFO UNIT 61, and overcome the problem described above.

Next, the I/O controller 62 including the reset controller 66 will be described.

Figure 7:
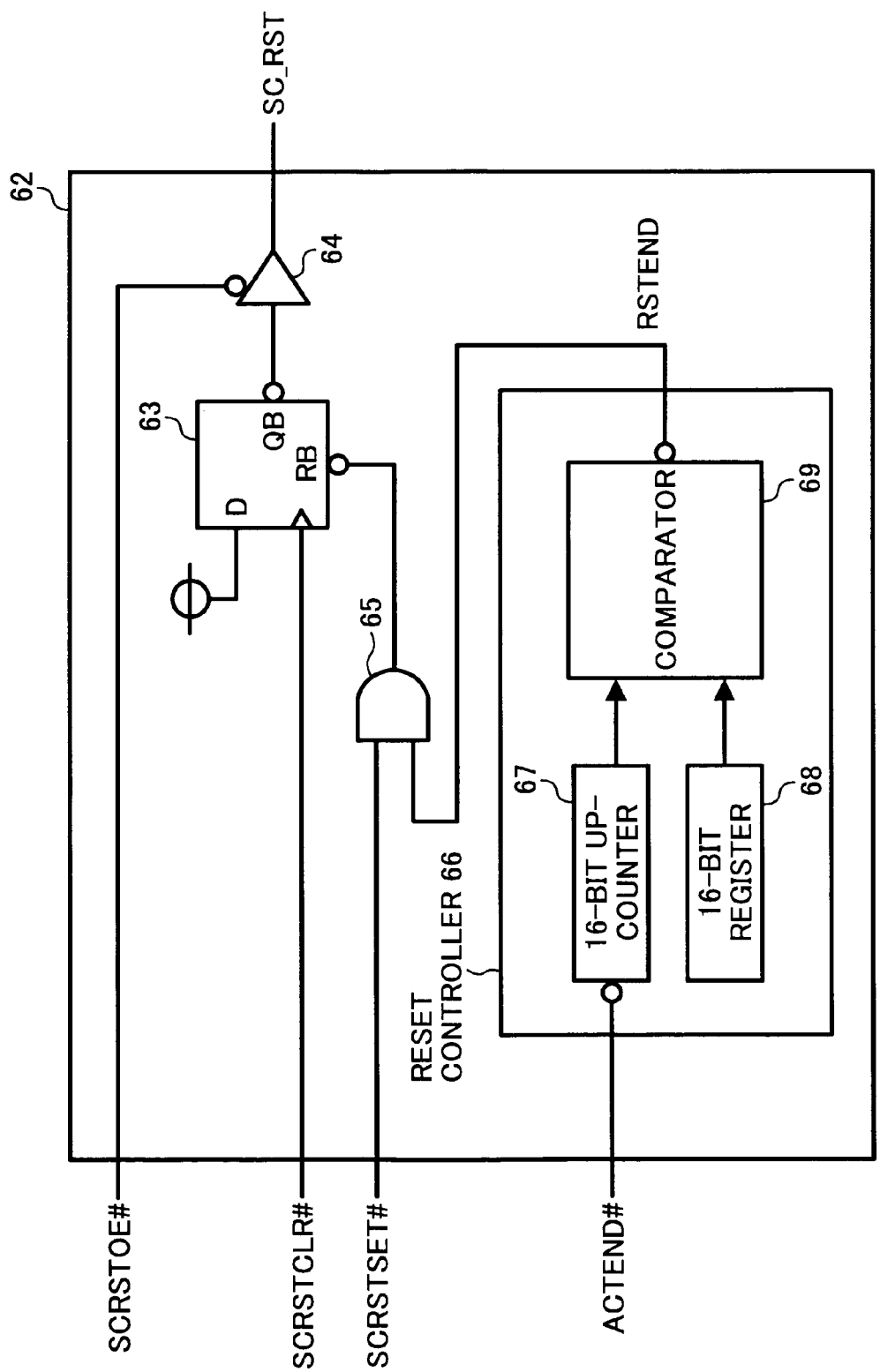
FIG. 7 is an exemplary diagram showing a configuration of an I/O controller.

FIG. 7 is an exemplary diagram showing the configuration of the I/O controller 62.

As compared with the conventional I/O controller 25 shown in FIG. 4, the I/O controller 62 additionally includes an AND gate 65 and the reset controller 66. Parts not relating to controlling reset are not shown.

A latch circuit 63, implemented by a flip-flop, has a data input terminal that receives input of a high-level signal (e.g., a power supply voltage Vcc). When a reset-output enable signal SCRSTOE# is switched to a low level, a uni-directional gate (tri-state buffer) 64 is turned on, whereby a high-level signal output from the latch circuit 63 is output to the smart card 1 as a reset signal SC_RST. The latch circuit 63 also has a timing-signal input terminal that receives input of a reset clear signal SCRSTCLR#. The reset clear signal SCRSTCLR# causes the output of the latch circuit 63 to be switched back to a high level after a reset.

The reset controller 66 includes a 16-bit counter 67, a register 68, and a comparator 69.

The 16-bit counter 67 starts counting upon receiving input of a low-level signal ACTEND# indicating completion of an activation process, output from the SCB controller 20.

The register 68 holds a 16-bit count value.

The comparator 69 compares a count value output from the counter 67 with a count value held by the register 68, and outputs a low-level reset end signal RSTEND when these count values coincide with each other.

Upon receiving input of the signal ACTEND# indicating completion of the activation process from the host CPU 5, the above-described reset controller 66 counts a predetermined number of clock cycles (e.g., 41,000), and outputs a low-level reset end signal RSTEND to complete a reset period.

The reset end signal RSTEND output from the comparator 69 of the reset controller 66 is input to one signal input terminal of the two-input AND gate 65. The other signal input terminal-of the AND gate 65 receives input of a reset-set signal SCRSTSET#, which is input to an I/O controller in the case of conventional art.

In the arrangement described above, when one of the reset-set signal SCRSTSET# and the reset end signal RSTEND becomes a low level, the AND gate 65 resets the latch circuit 63 having maintained the reset signal at a low level.

By allowing the setting value in the 16-bit register 68 of the reset controller 66 to be changed from the host CPU 5, it is possible to change setting so that a reset period satisfies a standard other than the EMV standard, for example, a reset period not longer than 40,000 clock cycles according to ISO 7816.

Figure 8:
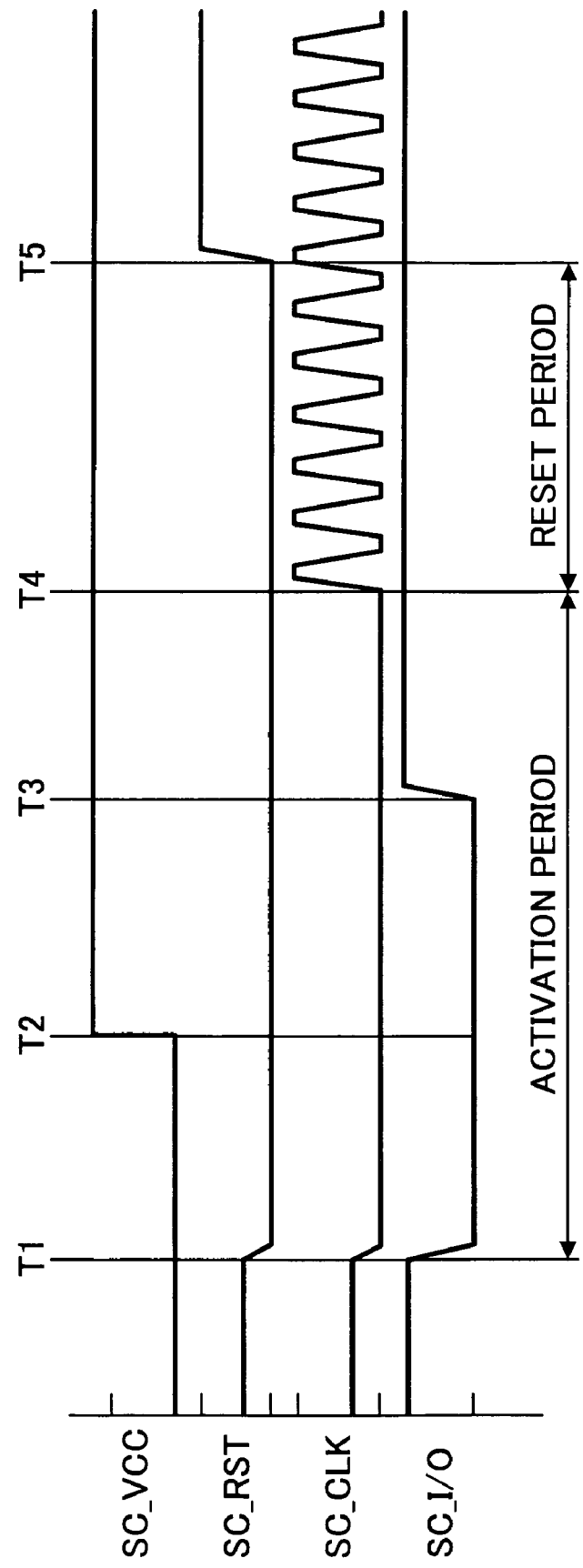
FIG. 8 is an exemplary timing chart of an activation process that is executed when a smart card is connected.

FIG. 8 is an exemplary timing chart showing an activation process that is executed at first by the smart-card controller 60 when the smart card 1 is connected, and also showing a reset period.

When an SC_DC# signal is switched to a low level, the card detector 24 detects that the smart card 1 is connected to the contact connector 16 (or the contact connector 80a in the case of the passive adapter 80) prior to timing T1, and notifies the SCB controller 20 of that effect.

The SCB controller 20 outputs a high-level interrupt signal SCCINT to the host CPU 5. The interrupt signal SCCINT is inverted by the PC-card interface 51, and the resulting PC-card interrupt signal RDY/INT# is sent to the PC-card controller 8, the chipset 4, and the host CPU 5.

Upon receiving the low-level interrupt signal RDY/INT#, the host CPU 5 executes the following activation process in order to start communication with the smart card 1.

First, at timing T1, the host CPU 5 controls the I/O controller 62 via the PC-card interface 51 and the SCB controller 20 in the smart-card controller 15, thereby switching the SC_RST, SC_CLK, and SC_I/O terminals from high-impedance to a low level.

Since a pull-up resistor required by the standard is connected between the smart-card controller 15 and the smart card 1, the SC_110 terminal is at a high level even in a high-impedance state.

At timing T2, the host CPU 5 controls the card detector 24 via the PC-card interface 51 and the SCB controller 20 in the smart-card controller 15, thereby switching the SC_PWR terminal to a high level.

Accordingly, a card power switch (refer to the switch 76 in FIG. 5) is turned on to start power supply to the SC_VCC terminal. At timing T3, the host CPU 5 controls the 110 controller 62 via the PC-card interface 51 and the SCB controller 20 in the smart-card controller 15, thereby switching the SC_I/O terminal to a high-impedance state, whereby a reception mode is entered.

At timing T4, the host CPU 5 controls the I/O controller 62 via the PC-card interface 51 and the SCB controller 20 in the smart-card controller 15, thereby starting supply of clock signals from the SC_CLK terminal. This concludes the activation process.

In response to the output of the clock signals, the SCB controller 20 outputs an activation completion signal ACTEND# to the reset controller 66.

Upon receiving the low-level activation completion signal ACTEND#, the reset controller 66 switches the SC_RST terminal to a high level at timing T5 after elapse of a predetermined reset period, thereby ending the reset period.

The host CPU 5 waits to receive an ATR signal (initial response signal) from the smart card 1 via the I/O controller 62 and other parts.

As described above, since the I/O controller 62 includes the reset controller 66 that operates independently as a timing controller, the problem that strict timing control of output signals is inhibited by the improved converter C1 is solved.

Hereinafter, another exemplary embodiment of the present invention will be described.

Figure 9:
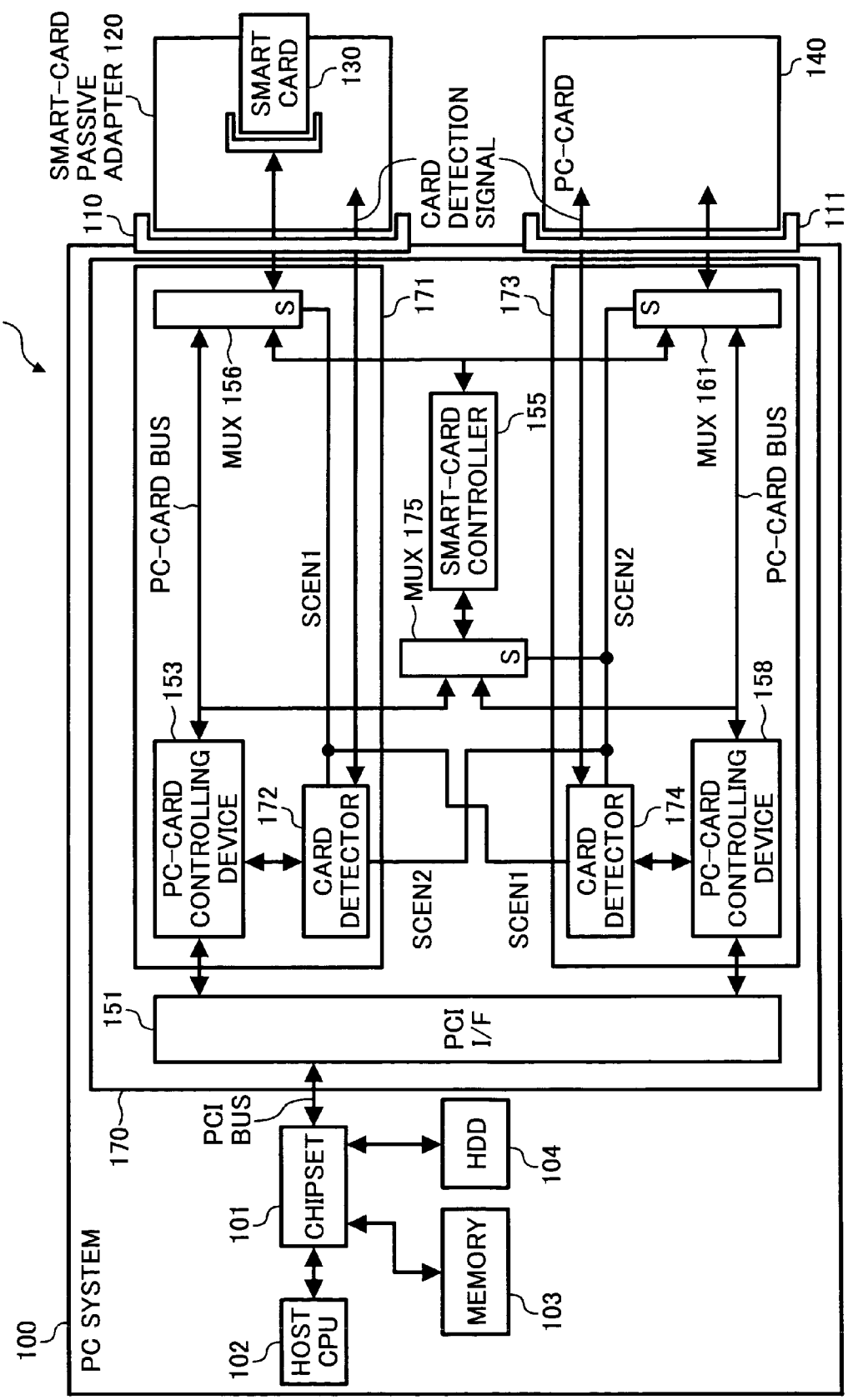
FIG. 9 is an exemplary diagram showing a configuration of a card recognition system according to another embodiment of the present invention.
Figure 12:
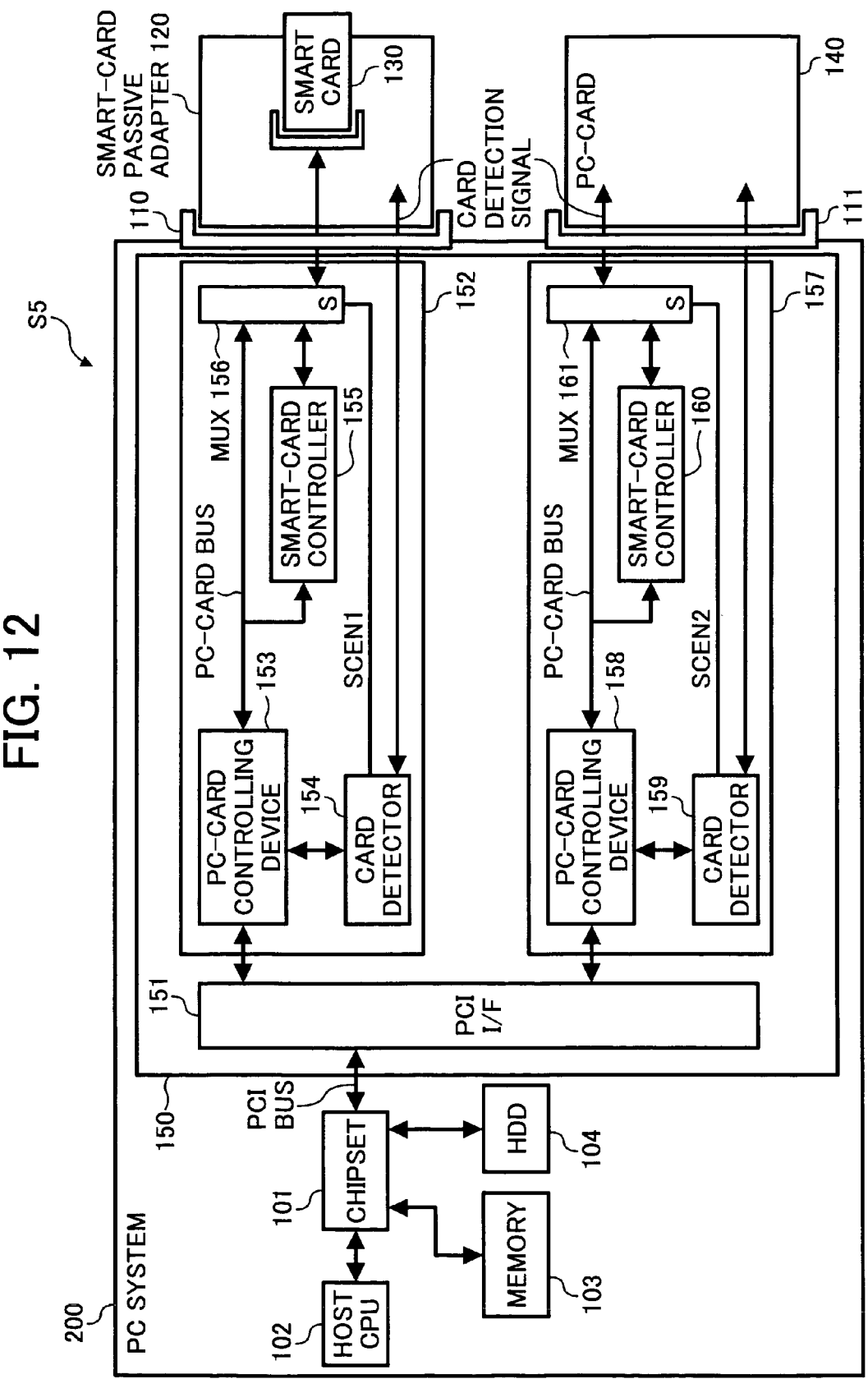
FIG. 12 is an exemplary diagram showing a configuration of another conventional card recognition system.

FIG. 9 is an exemplary diagram showing the configuration of a card recognition system S3 according to another exemplary embodiment of the present invention. In FIG. 9, parts corresponding to those of the conventional card recognition system S5 shown in FIG. 12 are designated by the same reference numerals.

The card recognition system S3 has two PC-card connectors 110 and 111. The card recognition system S3 also includes a computer 100 including a PC-card controller 170, and a passive adapter 120 for connecting a smart card 130 to the PC-card connector 110 or 111.

The computer 100 includes a chipset 101, a host CPU 102, a memory 103, a hard disk (HDD) 104, and the PC-card controller 170 provided around the chipset 101.

The PC card controller 170 includes a first controller 171 and a second controller 173 respectively associated with the two PC-card connectors 110 and 111, a shared multiplexer 175, a smart-card controller 155, and a PCI interface 151.

The first controller 171 and the second controller 173 are configured identically to each other except in that a smart-card enable signal SCEN2, which is an internal signal of the second controller 173, is input to a selection-signal input terminal S of the shared multiplexer 175.

Now, description will be directed to the first controller 171, with reference numerals of the corresponding parts of the second controller 173 in parentheses.

A card detector 172 (174) outputs information of a card connected to the connector 110 (111) to a PC-card controlling device 153 (158).

When a PC card 140 is connected, the card detector 172 (174) outputs a low-level smart-card enable signal SCEN1 (SCEN2) to a multiplexer 156 (161) and the card detector 174 (172) of the other controller 173 (171).

When the smart card 130 is connected via the passive adapter 120, the card detector 172 (174) outputs a high-level smart-card enable signal SCEN1 (SCEN2) to the multiplexer 156 (161) and the card detector 174 (172) of the other controller 173 (171).

In response to input of a high-level signal SCEN2 (SCEN1), the card detector 172 (174) stops the function of detecting a smart card.

When a low-level smart-card enable signal SCEN1 (SCEN2) is being input to the selection-signal input terminal S, the multiplexer 156 (161) connects the PC card controlling device 153 (158) and the PC card 140 connected to the connector 110 (111).

On the other hand, when a high-level smart-card enable signal SCEN1 (SCEN2) is being input to the selection-signal input terminal S, the multiplexer 156 (161) connects the smart-card controller 155 and the smart card 130 connected via the passive adapter 120.

The selection-signal input terminal S of the shared multiplexer 175 receives input of a smart-card enable signal SCEN2 output from the card detector 174 of the second controller 173.

When the smart-card enable signal SCEN2 is at a low level, the shared multiplexer 175 connects the smart-card controller 155 and the PC-card controlling device 153.

On the other hand, when the smart-card enable signal SCEN2 is at a high level, the shared multiplexer 175 connects the smart-card controller 155 and the PC-card controlling device 158.

With the arrangement described above, although only one smart-card controller 155 is provided, the smart card 130 can be connected to either one of the two PC-card connectors 110 and 111. The other connector can be connected only to a PC card.

More specifically, when the non-compliant smart card 130 is connected to one of the two connectors 110 and 111 via the passive adapter 120, the card detectors 172 and 174, the three multiplexers 156, 161, and 175, and the smart-card controller 155 allow the smart-card controller 155, functioning as a data converter, to act between the connector 110 or 111 connected to the smart card 130 and the PC-card controlling device 153 or 158, functioning as a standard card controller, and prohibit assignment of the smart-card controller 155 to the other one of the two connectors 110 and 111.

In the above-described situation, a combination of a specific card detector, a specific multiplexer, and a specific standard card controller is assigned to a specific connector provided to the card recognition system.

As described above, the card detectors 172 and 174 are configured in substantially the same manner.

Figure 10:
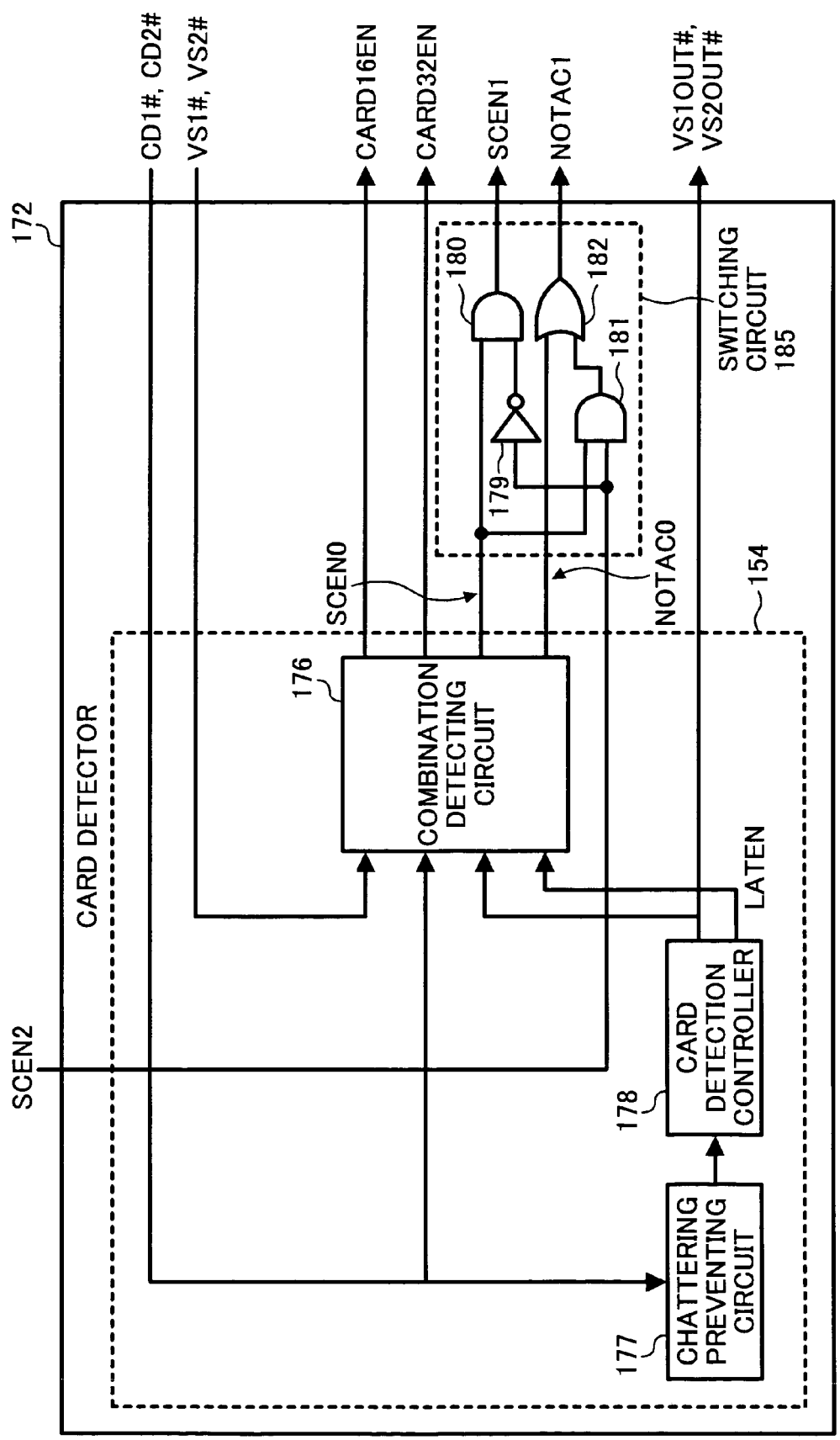
FIG. 10 is an exemplary diagram showing a configuration of a card detector.

Now, the configuration of the card detector 172 will be described with reference to FIG. 10.

The card detector 172 includes a combination detecting circuit 176, a chattering preventing circuit 177, a card-detection controller 178, and a switching circuit 185.

As enclosed by a dotted line, the conventional card detector 154 shown in FIG. 12 is formed by the combination detecting circuit 176, the chattering preventing circuit 177, and the card-detection controller 178.

When a PCMCIA-standard card is connected to the PC-card connector 110, CD1# and CD2# are switched to a low level. CD1# and CD2# are input to the card-detection controller 178 via the chattering preventing circuit 177 that prevents incorrect detection of a card.

The card-detection controller 178 controls and modifies the values of VS1OUT# and VS2OUT#.

The combination detecting circuit 176 receives input of CD1#, CD2#, VS1#, and VS2# as signals for detecting a connected card. The combination detecting circuit 176 holds CD1#, CD2#, VS1# and VS2# when a high-level latch-enable signal LATEN is output from the card-detection controller 178, and identifies the type of a connected card based on changes in the states of these signals.

Based on the values of these signals identified, the combination detecting circuit 176 switches to a high level one of a PCMCIA-compliant-16-bit-card enable signal CARD16EN, a PCMCIA-compliant-32-bit-card enable signal CARD32EN, a smart-card enable signal SCEN0, and a NOTAC0 indicating that a card of an unknown type is connected.

Amongst the four signals output from the combination detecting circuit 176, the 16-bit-card enable signal CARD16EN and the 32-bit-card enable signal CARD32EN are directly output to the PC-card controlling device 153 (FIG. 9), and the smart-card enable signal SCENO and the signal NOTAC0 are converted by the switching circuit 185 into SCEN1 and NOTAC01, which are output to the PC-card controlling device 153 (FIG. 9).

The switching circuit 185 receives input of the smart-card enable signal SCEN2 output from the card detector 174 of the other controller 173 shown in FIG. 9.

The switching circuit 185 includes one inverter 179, two AND gates 180 and 181, and one OR gate 182.

One input terminal of the two-input AND gate 180 receives input of a smart-card enable signal SCEN0, and the other input terminal of the two-input AND gate 180 receives input of a signal obtained by inverting the signal SCEN2 by the inverter 179. The output of the AND gate 180 serves as a signal SCEN1.

One signal input terminal of the two-input AND gate 181 receives input of the signal SCEN0, and the other signal input terminal of the two-input AND gate 181 receives input of the signal SCEN2. The output of the AND gate 181 is input to one signal input terminal of the two-input OR gate 182. The other signal input terminal of the OR gate 182 receives input of the signal NOTAC0. The output of the OR gate 182 serves as a signal NOTAC1.

According to the switching circuit 185 configured as described above, when the signal SCEN2 is at a low level, i.e., when a smart card is not connected to the connector 111, the signal SCEN0 and the signal NOTAC0 output from the combination detecting circuit 176 are directly output as signals SCEN1 and NOTAC1.

On the other hand, when the signal SCEN2 is at a high level, i.e., when a smart card is connected to the connector 111, if a smart card is connected to the connector 110 and the signal SCEN0 becomes a high level, since the smart card already connected to the connector 111 occupies the smart-card controller 155, the switching circuit 185 forcibly changes its decision to determine that the card is of an unknown type, and outputs a low-level signal SCEN1 and a high-level signal NOTAC1.

Since the assignment controller C includes the card detectors 172 and 174 configured as described above, a single smart-card controller can be shared by two PC-card connectors. Accordingly, the configuration of the PC-card controller is simplified while allowing use of a PC card and a smart card without particularly being conscious of a connector for using a smart card.

Numerous additional modifications and variations are possible in light of the above teachings. It is therefore to be understood that within the scope of the appended claims, the disclosure of the present invention may be practiced otherwise than as specifically described herein.

This application claims priority from Japanese patent applications No. 2003-302789 filed on Aug. 27, 2003, and No. 2003-320256 filed on Sep. 11, 2003 in the Japan Patent Office, the entire contents of which are hereby incorporated by reference herein.

What is claimed is:

1. A card recognition system, comprising:
a computer having a card controller for exchanging data with a standard card that is compliant with a standard and a non-standard card that is not compliant with the standard; and
an active card adapter for connecting the non-standard card to the computer so that the non-standard card is recognized, the active card adapter comprising:
a data converter having a non-standard card input/output controller for the non-standard card, and converting data of the non-standard card into data for the standard card; and
an interface connected to the data converter via a dedicated transmission path, said interface including an input/output interface controller for the standard card and an address decoder configured to convert address signals from said computer into control signals for said non-standard card input/output controller.

2. The card recognition system according to claim 1, wherein the data converter or the interface further comprises a circuit for converting a first number of bits of data output from the data converter into a second number of bits of data for a standard card.

3. The card recognition system according to claim 1, wherein the data converter further comprises a timing controller that independently controls timing of outputting a signal in response to a request from the computer.

4. The card recognition system according to claim 1, wherein the standard includes PCMCIA PC Card Standard, and the non-standard card includes a smart card.

5. The card recognition system of claim 1, wherein the active card adapter includes a FIFO unit connected by the dedicated transmission path to said interface.

6. The card recognition system of claim 1, wherein said input/output interface controller of said interface controls a timing of data transfer to and from said non-standard card.

7. A card recognition system, comprising:
a computer having a card controller for exchanging data with a standard card that is compliant with a standard and a non-standard card that is not compliant with the standard; and
a passive card adapter for connecting the non-standard card to the computer so that the non-standard card is recognized,
wherein the card controller comprises:
a data converter having an input/output controller for the non-standard card, and converting data of the non-standard card into data for the standard card; and
an interface having an input/output controller for the standard card, and connected to the data converter via a dedicated transmission path.

8. The card recognition system according to claim 7, wherein the data converter or the interface comprises a circuit for converting a first number of bits of data output from the data converter into a second number of bits of data for a standard card.

9. The card recognition system according to claim 7, wherein the data converter further comprises a timing controller that independently controls timing of outputting a signal in response to a request from the computer.

10. The card recognition system according to claim 7, wherein the data converter further comprises a buffer memory capable of storing an amount of data that is output from the non-standard card at one transmission.

11. The card recognition system according to claim 7, wherein the standard includes PCMCIA PC Card Standard, and the non-standard card includes a smart card.

12. The card recognition system of claim 7, wherein said data converter and said interface are in said card controller of said computer.

13. The card recognition system of claim 7, wherein said computer further includes a connector, and said card controller of said computer further comprises a card detector coupled to said connector of said computer and configured to detect when said standard card is connected to said computer through said connector and detect when said passive card adaptor is connected to said computer through said connector.

14. A card recognition system, comprising:
at least two sets of card management systems, each of the sets of card management systems comprising:
a card connector for connecting one of a standard card and non-standard card;
a first controller configured to control the standard card;
a first multiplexer arranged between the card connector and the first controller and configured to multiplex signals from the one of the standard card and the non-standard card connected to the card connector;
a card detector configured to detect the one of the standard card and the non-standard card connected to the card connector;
a second controller connected to the first multiplexer of each of the at least two sets of card management systems and configured to control the non-standard card; and
a second multiplexer connected to the second controller and the first controller of each of the at least two sets of card management systems,
wherein the first multiplexer and the card detector of each of the at least two sets of card management systems, the second controller, and the second multiplexer form a job assignment controller configured to cause the second controller to intervene between the first controller and a card connector and to prohibit assignment of the second controller to other card connectors when the non-standard card is connected directly or indirectly via an adaptor to one of the card connectors of the at least two sets of card management systems.

15. The card recognition system according to claim 14, wherein the card detector does not perform a detection of a non-standard card at other card connectors when the non-standard card is detected at a connector.

16. The card recognition system according to claim 14, wherein the standard is PCMCIA PC Card Standard, and the non-standard card includes a smart card.

* * * * *